(12) United States Patent
Bertin et al.

(10) Patent No.: US 9,456,460 B2
(45) Date of Patent: Sep. 27, 2016

(54) MECHANISM FOR MANAGING PDN CONNECTIONS IN LTE/EPC NETWORKS

(75) Inventors: Philippe Bertin, Acigne (FR); Khadija Daoud Triki, Meudon (FR); Xavier Grall, Mezieres sur Couesnon (FR); Dominique Pichon, Issy les Moulineaux (FR)

(73) Assignee: ORANGE, Paris (FR)

( * ) Notice: Subject to any disclaimer, the term of this patent is extended or adjusted under 35 U.S.C. 154(b) by 114 days.

(21) Appl. No.: 14/128,984

(22) PCT Filed: Jun. 25, 2012

(86) PCT No.: PCT/FR2012/051448
§ 371 (c)(1),
(2), (4) Date: Apr. 7, 2014

(87) PCT Pub. No.: WO2012/175896
PCT Pub. Date: Dec. 27, 2012

(65) Prior Publication Data
US 2014/0219188 A1 Aug. 7, 2014

(30) Foreign Application Priority Data

Jun. 24, 2011 (FR) ..................................... 11 55592

(51) Int. Cl.
*H04W 4/00* (2009.01)
*H04W 76/02* (2009.01)
(Continued)

(52) U.S. Cl.
CPC ............. *H04W 76/02* (2013.01); *H04W 36/12* (2013.01); *H04W 76/021* (2013.01); *H04W 76/041* (2013.01); *H04W 76/045* (2013.01)

(58) Field of Classification Search
CPC combination set(s) only.
See application file for complete search history.

(56) References Cited

U.S. PATENT DOCUMENTS

| 8,797,846 B2* | 8/2014 | Olsson et al. ................ 370/225 |
| 2007/0064686 A1* | 3/2007 | Bae et al. ..................... 370/356 |

(Continued)

FOREIGN PATENT DOCUMENTS

WO 2011025422 A1 3/2011

OTHER PUBLICATIONS

International Search Report and Written Opinion dated Sep. 28, 2012 for International Application No. PCT/FR2012/051448, filed Jun. 25, 2012.

(Continued)

*Primary Examiner* — Frank Duong
(74) *Attorney, Agent, or Firm* — David D. Brush; Westman Champlin & Koehler, P.A.

(57) ABSTRACT

A method is provided for managing at least one connection established between a mobile terminal and an anchor gateway located between a mobile network and a packet-switching network, and being capable of conducting at least one communication session with the packet-switching network. The method includes receiving a management message from a device suitable for managing the at least one connection, the message including at least one piece of information relating to a change in the state of a connection of the mobile terminal, and an identifier relating to the connection; determining the need for a new connection by analyzing the at least one current connection at least according to the received information; once it has been determined that the need for a new connection exists, triggering the transmission of a request to establish a new connection between the mobile terminal and a new anchor gateway according to the analysis.

12 Claims, 4 Drawing Sheets

(51) Int. Cl.
*H04W 36/12* (2009.01)
*H04W 76/04* (2009.01)

(56) References Cited

U.S. PATENT DOCUMENTS

2008/0259873 A1 10/2008 Ahmavaara et al.
2012/0214492 A1* 8/2012 Mihaly et al. ............... 455/437

OTHER PUBLICATIONS

French Search Report and Written Opinion dated Feb. 10, 2012 for corresponding French Application No. 11 55592, filed Jun. 24, 2011.
Tarik Taleb et al., "DNS-Based Solution for Operator Control of Selected IP Traffic Offload", ICC 2011-2011 IEEE International Conference on Communications—Jun. 5-9, 2011—Kyoto, Japan IEEE, Piscataway, NJ, USA, 5 Jun. 2011, pp. 1-5, XP031908889.
"3rd Generation Partnership Project; Technical Specification Group Services and System Aspects; General Packet Radio Service (GPRS) Enhancements for Evolved Universal Terrestrial Radio Access Network (E-UTRAN) Access (Release 10)", 3GPP Standard; 3GPP TS 23.401, 3rd Generation Partnership Project, Mobile Competence Centre; 650, Route Des Lucioles; F-06921 Sophia-Antipolis; FR, No. V10.2.1, 4 Jan. 2011, p. 1-275, XP050462517.
English translation of the International Written Opinion dated Sep. 28, 2012 for corresponding International Application No. PCT/FR2012/051448, filed Jun. 25, 2012.
Intel Corporation: "P-GW Relocation for SIPTO Session continuity", 3GPP Draft; S2-112518_Limonet_pgw-Relocation, 3rd Generation Partnership Project (3GPP), Mobile Competence Centre; 650, Route Des Lucioles; F-06921 Sophia-Antipolis Cedex; France, vol. SA WG2, No. Xi'An, 20110516, May 11, 2011, AP050525507.

* cited by examiner

MECHANISM FOR MANAGING PDN CONNECTIONS IN LTE/EPC NETWORKS

CROSS-REFERENCE TO RELATED APPLICATIONS

This Application is a Section 371 National Stage Application of International Application No. PCT/FR2012/051448, filed Jun. 25, 2012, which is incorporated by reference in its entirety and published as WO 2012/175896 A1 on Dec. 27, 2012, not in English.

1. FIELD OF THE INVENTION

The field of the invention is that of electronic communications, and more precisely that of management of the continuity of the services supported by packet switching networks and accessible from mobile terminals through RF telecommunication access networks.

2. PRIOR ART

In the LTE/EPC ("long term evolution/evolved packet core") networks standardized by 3GPP ("3rd Generation Partnership Project"), a packet communication session is borne by what is known as a PDN ("Packet Data Network") connection that is set up between a mobile terminal and an anchoring gateway, also called "PDN gateway", or P-GW for short.

Subsequently, a PDN connection is denoted simply by connection.

The anchoring gateway is situated on the border between an access, collection and transport network of an RF telecommunication operator, also called mobile network, with which the mobile terminal is associated, and a packet switching network, denoted by the name PDN in the 3GPP standard, with which the communication session is set up. This PDN may be the global Internet, or may be limited to one operator and/or to a precise type of application. The access point for the PDN is denoted by the name APN ("Access Point Name"). A piece of centralized management equipment called MME ("Mobility Management Entity") selects the anchoring gateway as a function of criteria comprising the APN used by the mobile terminal, and communicates to the mobile terminal a piece of information relating to a default bearer that allows it to set up the connection by using the selected anchoring gateway.

3GPP standard TS 23.401 v10.2.1 provides (section 4.3.15) a mechanism for selecting an anchoring gateway for the LTE/EPC network that is closest to the base station with which a mobile terminal has associated itself. When this gateway becomes less than optimum following a change of conditions, such as mobility causing a change of base station for this terminal, the same standard provides (section 5.10.3) another mechanism involving disconnection and then reconnection of the terminal, the effect of which is to allocate another, more suited gateway.

Figure 1:
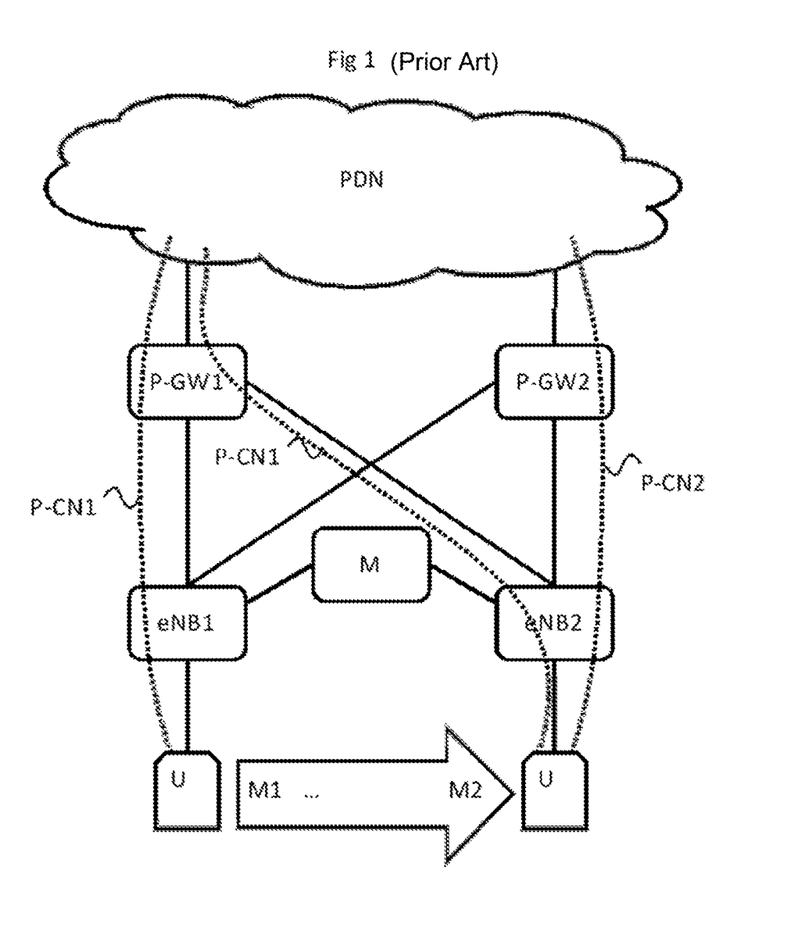
FIG. 1, which has been presented previously, shows the procedure for changing allocation of an anchoring gateway to a mobile terminal, according to the prior art, allowing support of a connection between a mobile terminal and a packet switching network.

The procedure comprising these two mechanisms according to the prior art is presented with reference to the elements in FIG. 1.

At a moment M1 that precedes mobility, in order to open communication sessions toward an access point APN of the packet switching network PDN, a mobile terminal U has set up a connection P-CN1 to an anchoring gateway P-GW1, previously selected by a piece of management equipment M for the pair {U; APN}.

More exactly, the management equipment M allocates to the mobile terminal U a default bearer to the anchoring gateway, and it is the identifier of this default bearer that is used to uniquely identify the connection that is subsequently set up.

At a moment M2 that is consecutive to mobility, the terminal U has changed associated base station but has kept the same connection P-CN1, by virtue of a conventional mobile transfer procedure ("mobile handover"). The connection P-CN1 no longer goes through the base station eNB1, but rather goes through eNB2. In an LTE/EPC network, a base station allows a mobile terminal to connect to all anchoring gateways via a serving gateway (not shown in the figure).

The management equipment M detects that, for the new location of the terminal U, that is to say for the base station eNB2, the anchoring gateway P-GW1 is less suited than P-GW2, and therefore allocates P-GW2 as new anchoring gateway for the pair {U; APN}. The management equipment M then instructs the terminal U to release the connection P-CN1, and then to request the setup of a new connection P-CN2, which will automatically be done using P-GW2.

In a variant that is not illustrated, the management equipment M may also decide to allocate P-GW2 as new gateway for the pair {U; APN} without there being mobility for the terminal U, for example if a change of conditions for the network brings about a traffic overload on P-GW1. The management equipment M then instructs the terminal U to release the connection P-CN1, and then to request the setup of a new connection P-CN2, which will automatically be done using P-GW2.

It can be seen that, according to the prior art, the two connections P-CN1 and P-CN2 cannot coexist.

It can also be understood that the procedure according to the prior art necessitates disconnection immediately followed by reconnection. The disconnection interrupts communication sessions in progress, and as reconnection involves the allocation of a new address (in the form of an IP, "Internet Protocol", address and/or of a new prefix to said address) to the mobile terminal by the gateway, the sessions must be reinitialized. There is therefore a break in the continuity of service.

The patent application WO 2011.025422 teaches the advance setup of a new bearer that is intended to replace an old bearer, following a change of conditions, such as the mobility of a terminal that has set up a connection that is borne by the old bearer. Advance identification of the new bearer has the advantage of speeding up the activation of a new connection between the terminal and a new anchoring gateway, but does not prevent interruption of sessions in progress that are borne by the old connection, and therefore does not prevent a break in the continuity of service.

There is a need for a solution that allows this break in continuity of communication sessions to be avoided completely.

3. SUMMARY OF THE INVENTION

The invention improves the situation by means of a method for managing at least one connection, a connection being set up between a mobile terminal and an anchoring gateway situated between a mobile network and a packet switching network, and being capable of bearing at least one communication session to the packet switching network, characterized in that it comprises the following steps reception of a management message from a piece of equipment that is capable of managing said at least one connection, said message comprising at least one piece of information relating to a change of state for a connection of the mobile terminal, and an identifier relating to the connection, determination of a need for a new connection, by analysis of said at least one connection in progress at least on the basis of the received information, when it is determined that the need for a new connection exists, triggering of the transmission of a request for setup of a new connection between the mobile terminal and a new anchoring gateway, as a function of the analysis.

In the method for managing at least one connection according to the invention, the step of reception of a management message informs the mobile terminal that a connection using an anchoring gateway has changed state and therefore that it has become, or that it is no longer, the one best suited to the conditions of the network. This makes it possible to allow the mobile terminal to itself initiate the possible necessary actions resulting from this change of state, rather than forcing these actions on the terminal in centralized fashion.

According to the invention, the step of analysis of the connections in progress takes account, for example using a table that is updated following the reception of the management message, of information about each connection in progress on the mobile terminal, such as the state thereof, the number and type of sessions possibly borne by the connection. It likewise takes account of other information that the terminal has, for example possible instructions given by its user. The analysis of all this information determines the need for a new connection for the mobile terminal.

According to the invention, the transmission of a request for setup of a new connection is triggered following the analysis of the connections in progress, without being associated with a disconnection order followed by a reconnection order, in contrast to the prior art. Thus, the terminal is able to keep the connection concerned by the management message active, if it so desires, the time when communication sessions borne by the connection terminate, and to avoid disturbing or losing flows of data associated with communication sessions.

It can be understood that, by virtue of the invention, it is the terminal that decides about the setup of a new connection rather than a piece of management equipment on the network.

According to one aspect of the invention, the method for managing at least one connection is characterized in that the state of the connection takes a value from a group comprising at least the following values "obsolete", "preferred".

The allocation, to each of the connections used by a mobile terminal, of one of two possible state values, in this case "obsolete" or "preferred", allows the terminal to favor preferred connections at the expense of obsolete connections. Thus, if no preferred connection exists, the mobile terminal can decide to set one up, and can decide to release the obsolete connections.

In a preferred embodiment of the invention, only two connection state values are used, "obsolete" and "preferred", and when a plurality of simultaneous connections for a given pair {terminal; APN} exist on a mobile terminal, no more than a single connection can be in the "preferred" state.

In one advantageous variant, more than two possible state values can be used to represent several degrees of preference in a scale of values between "obsolete" and "preferred".

In another advantageous variant, more than one connection can be in the "preferred" state.

According to another aspect of the invention, the method for managing at least one connection is characterized in that the step of transmission of a request for setup of a new connection is triggered when there is no connection in the "preferred" state.

The advantage of this aspect of the invention is authorization of the setup of a new connection if there is not already one that is in the "preferred" state. This allows the use of an optimum anchoring gateway for new traffic.

According to another aspect of the invention, the method for managing at least one connection is characterized in that the step of transmission of a request for setup of a new connection is triggered by the obtainment of an indication according to which a new communication session is necessary.

The advantage of this aspect of the invention is setup of a new connection to the second anchoring gateway only if said connection is necessary in order to bear a new communication session. This avoids the unnecessary mobilization of a connection as long as the need to make it bear at least one communication session is not identified. The indication according to which the need appears can come from the user himself, via an application that he has launched on the mobile terminal.

According to another aspect of the invention, the method for managing at least one connection is characterized in that the method comprises a step of release of the connection, triggered as a function of the analysis and when the connection no longer bears any communication session.

Only one connection in the "obsolete" state can be the object of a release according to this aspect of the invention, and it is the analysis that determines if the connection is in the "obsolete" state and if no other obstacle to the release thereof exists. Apart from the advantage of putting an end to the use of an anchoring gateway that is no longer the one best suited to sending the flows of data from the mobile terminal, the main advantage of this aspect of the invention is guaranteeing continuity of service. The reason is that the connection is not released as in the prior art upon a disconnection order from the network, and the communication sessions that it bears are not interrupted abruptly. The connection is released only after the natural end of the communication sessions that it bears.

According to one variant, the connection is released even if there remain(s) one or more communication sessions in progress, on condition that they are not transporting any flows of useful data.

According to another aspect of the invention, the method for managing at least one connection is characterized in that the method comprises a step of release of the connection, triggered as a function of the analysis and when a predetermined time of use of the connection has been reached, the time being received in the management message.

The advantage of this aspect of the invention is avoidance of maintaining a connection beyond a certain time limit, because this would be prolonging the use of an anchoring gateway that is no longer the one best suited to sending the flows of data from the mobile terminal. By way of example, it is possible that it is unreasonable to wait for all communication sessions borne by the connection to terminate naturally, either because the anchoring gateway has reached its maximum capacity or because maintenance operations are planned on the anchoring gateway, requiring the load thereon to be transferred to other anchoring gateways. Through the management message it is possible, in cases such as these, to indicate in advance to the mobile terminal how much time remains for the connection before, by way of example, it is cut off by the network or the anchoring gateway is taken out of service. It may be envisaged that, in an emergency, the time takes a zero value, thereby indicating that the release of the connection must be immediate.

In one advantageous variant, the release of a connection can occur at the first of two deadlines
  upon expiry of the time above,
  upon expiry of another time measured from cessation of the useful data traffic that is observed on the connection,
at least one of the two times being transmitted in the management message.

The invention also relates to a method for assigning a state to a connection between a mobile terminal and an anchoring gateway situated between a mobile network and a packet switching network, the connection being capable of bearing at least one communication session to the packet switching network, implemented by a piece of equipment that is capable of managing the connection, characterized in that it comprises the following steps
  a step of decision about a change of state for the connection, as a function of at least one predetermined criterion,
  a step of transmission of a management message comprising at least one piece of information relating to the decided change of state, and an identifier relating to the connection.

According to this method, a piece of equipment on the network that is capable of managing a connection for the mobile terminal informs the terminal as soon as possible of a change concerning a connection, following a change of conditions affecting the network in general, and the anchoring gateway used up until then by this connection in particular. This is in contrast to the prior art, where the mobile terminal is never informed, apart from a disconnection/reconnection mechanism. This allows the mobile terminal to trigger connection setup and/or release actions, while ensuring continuity of service. These actions undertaken by the previous method are made possible by virtue of the decision about a change of state and by virtue of the associated management message transmitted by this method. If more than one connection exists on the mobile terminal intended to receive the message, the connection identifier allows said mobile terminal to determine which connection is concerned by the message.

The list of predetermined criteria that can be used in the step of decision about a change of state for the connection comprises at least the following criteria
  location of the mobile terminal,
  type of session open on the connection,
  APN used,
  load state of the anchoring gateway,
  load state of another gateway.

These criteria make it possible to take a decision on the basis of all conditions that can have an impact on the performance of the network in general, and of the anchoring gateway in particular. A change of anchoring gateway is necessary either for reasons of mobility of the mobile terminal or for other reasons without there necessarily being geographical mobility for the mobile terminal, such as when it is desirable to transfer a portion of the traffic to one or more other anchoring gateways.

According to one aspect of the invention, the method for assigning a state to a connection is characterized in that the management message likewise comprises at least one piece of information pertaining to predetermined time of use of the connection.

The advantage of this aspect of the invention is the ability to indicate to the mobile terminal the time limit beyond which it is not necessary to maintain a given connection, at the risk of prolonging the use of an anchoring gateway that is no longer the one best suited to sending the flows of data from the mobile terminal.

The invention also relates to a device for managing at least one connection, a connection being set up between a mobile terminal and an anchoring gateway situated between a mobile network and a packet switching network, and being capable of bearing at least one communication session to the packet switching network, characterized in that it comprises the following means
  reception of a management message from a piece of equipment that is capable of managing said at least one connection, said message comprising a piece of information relating to a change of state for a connection of the mobile terminal, and an identifier relating to the connection,
  determination of a need for a new connection, by analysis of said at least one connection in progress at least on the basis of the received information,
  transmission of a request for setup of a new connection between the mobile terminal and a new anchoring gateway, as a function of the analysis, these means being capable of being implemented when it is determined that the need for a new connection exists.

The invention also relates to a device for assigning a state to a connection between a mobile terminal and an anchoring gateway situated between a mobile network and a packet switching network, the connection being capable of bearing at least one communication session to the packet switching network, implemented by a piece of equipment that is capable of managing the connection, characterized in that it comprises the following means
  decision about a change of state for the connection, as a function of at least one predetermined criterion,
  transmission of a management message comprising at least one piece of information relating to the decided change of state, and an identifier relating to the connection.

The invention also relates to a mobile terminal that is capable of setting up at least one connection to at least one anchoring gateway situated between a mobile network and a packet switching network, characterized in that it comprises a device for managing at least one connection.

The invention also relates to a piece of equipment that is capable of managing at least one connection between at least one mobile terminal and at least one anchoring gateway situated between a mobile network and a packet switching network, characterized in that it comprises a device for assigning a state to a connection.

The invention likewise relates to a system for managing at least one connection and for assigning a state to a connection, capable of setting up and managing at least one connection between a mobile terminal and an anchoring gateway situated between a mobile network and a packet switching network, characterized in that it comprises at least one device for managing at least one connection, and at least one device for assigning a state to a connection.

The invention also relates to a computer program characterized in that it comprises instructions for the implementation of a method for managing at least one connection, when said program is executed by a processor.

Finally, the invention relates to a computer program characterized in that it comprises instructions for the implementation of a method for assigning a state to a connection, when said program is executed by a processor.

These programs, which are stored on a computer-readable medium, are able to use any programming language, and to be in the form of source code, object code, or an intermediate code between source and object code, such as in a partially compiled form, or in any other desirable form.

4. PRESENTATION OF THE FIGURES

Other advantages and features of the invention will emerge more clearly upon reading the following description of a particular embodiment of the invention, given by way of simple illustrative and nonlimiting example, and of the appended drawings, in which.

5. DETAILED DESCRIPTION OF AT LEAST ONE EMBODIMENT OF THE INVENTION

In the remainder of the description, a network based on the 3GPP standards that apply to LTE/EPC networks is considered, but the invention potentially applies to any type of network, including those based on future, or earlier, standards, such as the standards that apply to UMTS networks.

Figure 2:
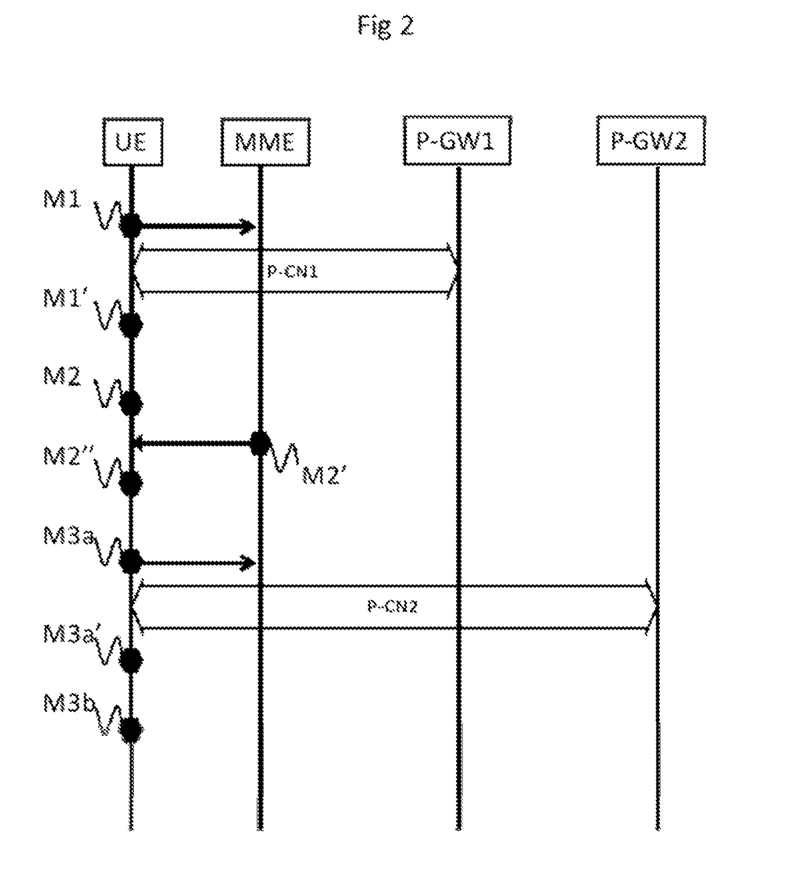
FIG. 2 shows an example of implementation of the methods for managing at least one connection and for assigning a state to a connection, according to a particular embodiment of the invention.

An example of implementation of the methods for managing at least one connection and for assigning a state to a connection, according to a particular embodiment of the invention, is now presented, with reference to FIG. 2. Some elements from the prior art are reused with reference to FIG. 1. The methods will then be presented in more detail with reference to FIGS. 3 and 4.

At the moment M1 that precedes mobility, in order to open communication sessions toward an access point APN for the packet switching network PDN, a mobile terminal UE transmits a request to a piece of management equipment MME in order to set up a connection P-CN1 to an anchoring gateway P-GW1, which has previously been selected by the management equipment MME for the pair {UE; APN}. Since the management equipment MME has allocated the state value "preferred" to this connection P-CN1, the terminal UE updates a table of connections T, at a moment M1'.

At the moment M2 that is consecutive to mobility of the terminal UE, the associated base station has changed. The connection P-CN1 no longer goes through the base station eNB1, but rather goes through eNB2.

At a moment M2', the management equipment MME detects that, for the new location of the UE, that is to say for the base station eNB2, the anchoring gateway P-GW1 is less suited than another anchoring gateway P-GW2. The management equipment MME therefore selects P-GW2 as new anchoring gateway for the pair {UE; APN}, and sends a management message to the UE comprising the new state value of P-CN1, "obsolete", and the identifier Id-P-CN1, relating to P-CN1. The management equipment MME does not instruct the UE to release the connection P-CN1, or to request the setup of a new connection.

At a moment M2", on reception of the management message, the UE updates its table of connections T with the information received in the management message. The UE does not open a new session on P-CN1, because its state is "obsolete".

At a moment M3b, once all sessions in progress that are borne by P-CN1 have terminated naturally, the terminal UE releases P-CN1, and removes P-CN1 from the table of connections T.

The terminal UE sets up a new connection P-CN2, which is automatically done using P-GW2, but only from the moment M3a at which the need for a new communication session appears, consecutively to an action on the part of the user on the terminal UE, for example. This new connection P-CN2 receives "preferred" as state value, and is added to the table of connections at the moment M3a'.

If, for any reason, no other connection exists, even in the "obsolete" state, it is envisagable not to await the need for a new session in order to set up the new connection P-CN2, so as to permanently have an available connection on the terminal UE.

In a variant that is not illustrated, the management equipment MME may also decide to allocate P-GW2 as new gateway for the pair {UE; APN} without there being mobility for the UE, for example if a change of conditions for the network brings about a traffic overload on the P-GW1. The management equipment MME sends a management message to the UE comprising the new state value of P-CN1, "obsolete", and the identifier Id-P-CN1 relating to P-CN1, which triggers, as previously, the same actions on the initiative of the UE.

The chronological order of moments M3a and M3b is random, and it can therefore be seen that, according to the invention, the two connections P-CN1 and P-CN2 can coexist, either in the "obsolete" state or in the "preferred" state. This makes it possible for communication sessions in progress not to be cut off abruptly and for continuity of service to be guaranteed.

Figure 3:
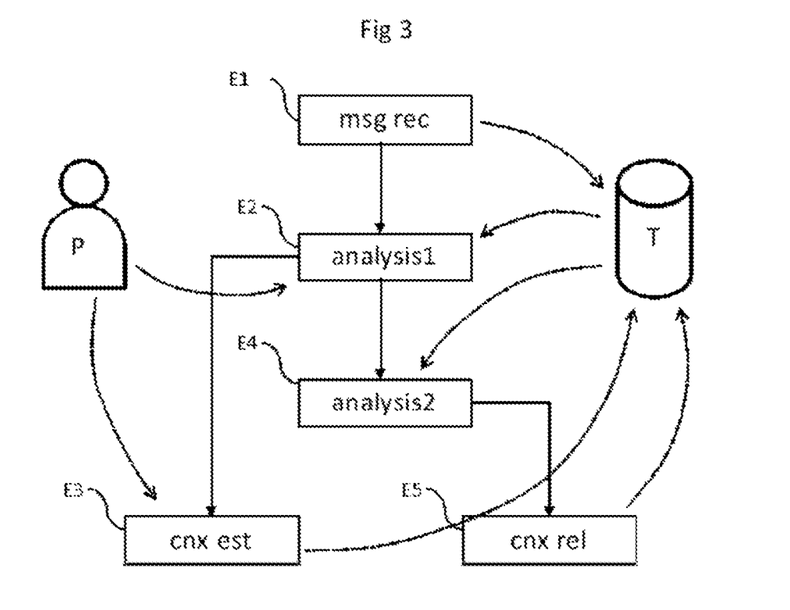
FIG. 3 shows a particular example of implementation of the method for managing at least one connection, according to the invention.

A particular example of implementation of the method for managing at least one connection according to the invention is now described, with reference to FIG. 3. Such a method can be implemented by a device for managing at least one connection. Advantageously, this device may be integrated in a mobile terminal.

Step E1 receives a message comprising a piece of information relating to a change of state for a connection P-CN1, the identifier relating to the connection, Id-P-CN1, and, if need be, a time of use of the connection P-CN1. This makes it possible to update a table of connections, T, which comprises, for each entry:

a connection identifier,
the state of said connection, the list of sessions that it bears, and
if need be, its time of use.

Step E2 analyzes the table T that has just been updated, and, if need be, other local parameters, such as parameters fixed by a user P, in order to determine the actions to be undertaken on the connections.

If the update performed in step E1 relates to the change of P-CN1 from a "preferred" state to an "obsolete" state, and if the local parameters do not prevent it, the two steps E3 and E4 are triggered in parallel. The change of P-CN1 to the "obsolete" state means that there is no longer a connection in the "preferred" state in the table T, since no more than one connection may be in the "preferred" state in this embodiment.

A local parameter that can prevent the following steps from being triggered is, by way of example, a preference fixed by the user P for permanent use of the connection P-CN1 in order to bear his communication sessions, as long as the network so allows, that is to say if no time of use is indicated in the management message.

If the update performed in step E1 relates to the change of a connection from an "obsolete" state to a "preferred" state, neither of the two steps E3 and E4 is triggered. The change of the connection P-CN1 to the "preferred" state means that it has become the only connection in the table T to be in the "preferred" state, since no more than one connection may be in the "preferred" state in this embodiment. Any new communication session will therefore by borne by P-CN1 without there being a need for a new connection to be set up beforehand.

Such a situation may arise, by way of example, when, following first mobility of the mobile terminal that makes it leave an area served by a base station, the value of the state of the connection P-CN1 has become "obsolete" and then, following second mobility that makes the mobile terminal return to the initial area, before the connection P-CN1 has been released, the connection P-CN1 adopts its "preferred" state again.

Step E3 transmits, according to a previously known mechanism, such as the mechanism provided by 3GPP standard TS 23.401 v10.2.1, a request for setup of a new connection P-CN2. Once the connection P-CN2 has been set up, using an anchoring gateway that is different than the one used by P-CN1, a new entry is added to the table T, with the identifier Id-P-CN2 of P-CN2 in a first field and the state of P-CN2, "preferred", in a second field. A third field containing the list of sessions is updated as sessions borne by P-CN2 are opened and closed. A fourth field, containing the time of use, is left blank.

In one advantageous variant, step E3 is triggered after step E2 only from the moment at which a new communication session must be open, for example on the initiative of the user P of the mobile terminal.

Step E4 analyzes the development over the course of time of the connection P-CN1 that has become "obsolete", for example by examining the field containing the list of sessions borne by P-CN1 in the table T. From the moment at which no further session is borne by P-CN1, step E5 is triggered. It can be seen that, between steps E4 and E5, the natural end of the session or sessions is awaited, and that a certain period of time may pass.

In step E4, if the field of P-CN1 provided for a time of use is not blank, step E5 is triggered when this time runs out, even if P-CN1 is still bearing one or more sessions.

Step E5 releases the connection P-CN1 and removes the corresponding entry in the table T.

Figure 4:
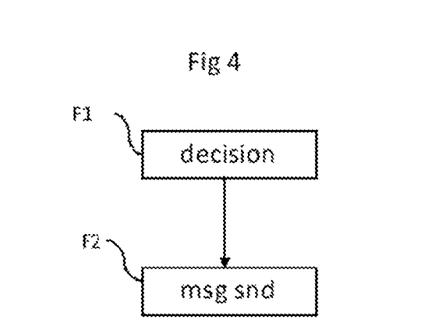
FIG. 4 shows a particular example of implementation of the method for assigning a state to a connection, according to the invention.

A particular example of implementation of the method for assigning a state to a connection according to the invention is now described, with reference to FIG. 4. Such a method may be implemented by a device for assigning a state to a connection. Advantageously, this device may be integrated in a piece of equipment for centralized management of the connections, such as a piece of management equipment MME.

Step F1 determines if the adequacy of an anchoring gateway P-GW1 for the use that is made thereof by a connection P-CN1 has changed. To do this, various predetermined criteria are taken into account, such as the location of the mobile terminal UE, the type of sessions borne by P-CN1, the type of access point APN for the packet switching network PDN with which the sessions are open, the load state of P-GW1 and the other known anchoring gateways, the timetable for maintenance of the anchoring gateways or of other equipment of the network.

In a first case, step F1 takes the decision to change the state of a connection P-CN1 from "preferred" to "obsolete" if it is detected that there exists an anchoring gateway P-GW2 that is better suited for the pair {UE; APN} than the anchoring gateway P-GW1 associated with P-CN1.

In a second case, step F1 takes the decision to change the state of a connection P-CN1 from "obsolete" to "preferred" if it is detected that there does not exist an anchoring gateway P-GW2 that is better suited for the pair {UE; APN} than the anchoring gateway P-GW1 associated with P-CN1, and if P-CN1 is in the "obsolete" state beforehand.

The two cases trigger step F2, which transmits a message comprising the new state of P-CN1 and the identifier Id-P-CN1 of P-CN1.

In the first case, in which the new state is "obsolete", the message transmitted by step F2 may likewise comprise a time of use for P-CN1, indicating that the connection P-CN1 must be released on the expiry of this time. If such a time is included and it is equal to zero, this indicates that the connection must be released as soon as the message is received.

Figure 5:
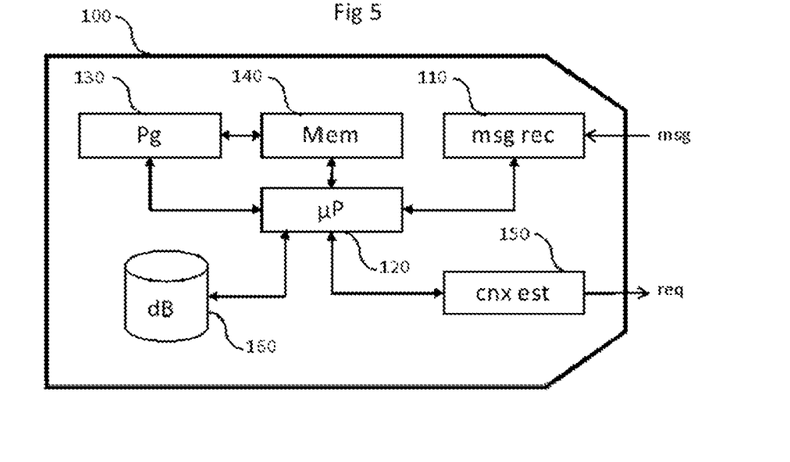
FIG. 5 shows the structure of a mobile terminal implementing the method for managing at least one connection, according to the invention.

With reference to FIG. 5, the structure of a mobile terminal UE, according to the invention, is now presented.

According to one aspect of the invention, this mobile terminal UE comprises a device 100 for managing at least one connection. The management device 100 according to the invention comprises a reception module 110 that is capable of receiving a management message from a piece of management equipment MME. The data in a message are processed by a processing unit 120 that is equipped with a microprocessor that is capable of implementing the means that constitute the invention as have been described previously, particularly means for analyzing connections in progress, including means for consulting and updating a table of connections that are contained in a database 160, and means for releasing a connection.

The management device 100 according to the invention furthermore comprises a memory 140 that stores a computer program 130 implementing the steps of the management method. The management device 100 according to the invention furthermore comprises a transmission module 150 that is capable of transmitting a request for setup of a new connection.

On initialization, the code instructions of the computer program 130 are loaded into a memory RAM before being executed by the processor of the processing unit 120, for example.

Figure 6:
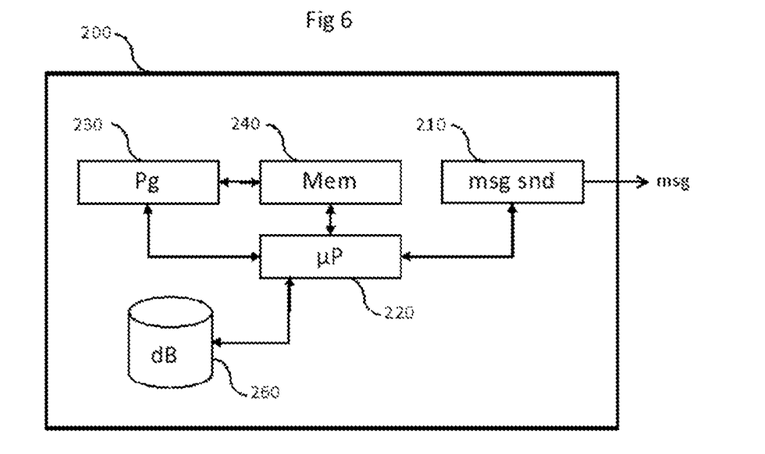
FIG. 6 shows the structure of a piece of equipment that is capable of managing a connection implementing the method for assigning a state to a connection, according to the invention.

With reference to FIG. 6, the structure of a piece of management equipment MME, which is capable of managing connections according to the invention, is now presented.

According to one aspect of the invention, this equipment MME comprises a device 200 for assigning a state to a connection. The assignment device 200 according to the invention comprises a transmission module 210 that is capable of transmitting a management message to a mobile terminal. The data in the message are prepared by a processing unit 220 that is equipped with a microprocessor that is capable of implementing the means that constitute the invention as have been described previously, particularly means for deciding about a change of state for a connection, including means for consulting and updating a table of connections that are contained in a database 260, and means for transmitting a management message.

The assignment device 200 according to the invention furthermore comprises a memory 240 that stores a computer program 230 implementing the steps of the assignment method.

On initialization, the code instructions of the computer program 230 are loaded into a memory RAM before being executed by the processor of the processing unit 220, for example.

The exemplary embodiment of the invention that has just been presented is just one of the envisagable embodiments that show that the invention allows continuity of service to be guaranteed by finer management of connections. By way of example, other embodiments will use more than two state values for the connections, or will allow more than one connection in the "preferred" state to coexist on a mobile terminal, for example.

The embodiments are not limited to application to mobile networks, and can also be applied to the management of connections to a packet switching network from a landline terminal.

The invention claimed is:

1. A method for managing at least one connection, a connection being set up between a mobile terminal and an anchoring gateway situated between a mobile network and a packet switching network, and being capable of bearing at least one communication session to the packet switching network, wherein the method comprises the following acts:
    reception of a management message from a piece of equipment that is capable of managing said at least one connection, said message comprising at least one piece of information relating to a change of the connection to an obsolete state without an instruction for the mobile terminal to release the connection, and an identifier relating to the connection,
    determination of a need for a new connection, by analysis of said at least one connection in progress at least on the basis of the received information,
    when the analysis determines that a need for the new connection exists, triggering a transmission of a request for setup of the new connection between the mobile terminal and a new anchoring gateway, as a function of the analysis.

2. The method for managing at least one connection as claimed in claim 1, wherein the state of the connection takes a value from a group comprising at least the following values:
    "obsolete",
    "preferred".

3. The method for managing at least one connection as claimed in claim 2, wherein the act of transmission of a request for setup of the new connection is triggered when there is no connection in the "preferred" state.

4. The method for managing at least one connection as claimed in claim 3, wherein the act of transmission of a request for setup of the new connection is triggered by the obtainment of an indication according to which a new communication session is necessary.

5. The method for managing at least one connection as claimed in claim 3, wherein the method comprises an act of release of the connection, triggered by the mobile terminal as a function of the analysis and when the connection no longer bears any communication session.

6. The method for managing at least one connection as claimed in claim 3, wherein the method comprises an act of release of the connection, triggered by the mobile terminal as a function of the analysis and when a predetermined time of use of the connection has been reached, the time being received in the management message.

7. A method for assigning a state to a connection between a mobile terminal and an anchoring gateway situated between a mobile network and a packet switching network, the connection being capable of bearing at least one communication session to the packet switching network, implemented by a piece of equipment that is capable of managing the connection, wherein the method comprises the following acts:
    making a decision about a change of the connection to an obsolete state, as a function of at least one predetermined criterion,
    transmission of a management message comprising at least one piece of information relating to the decided change to the obsolete state without an instruction for the mobile terminal to release the connection, and an identifier relating to the connection.

8. The method for assigning a state to a connection as claimed in claim 7, wherein the management message likewise comprises at least one piece of information pertaining to predetermined time of use of the connection.

9. A device for managing at least one connection, a connection being set up between a mobile terminal and an anchoring gateway situated between a mobile network and a packet switching network, and being capable of bearing at least one communication session to the packet switching network, wherein the device comprises:
    a receiver configured to receive a management message from a piece of equipment that is capable of managing said at least one connection, said message comprising a piece of information relating to a change of the connection to an obsolete state without an instruction for the mobile terminal to release the connection, and an identifier relating to the connection,
    means for determination of a need for a new connection, by analysis of said at least one connection in progress at least on the basis of the received information, and
    a transmitter configured to transmit a request for setup of the new connection between the mobile terminal and a new anchoring gateway, as a function of the analysis and is implemented when the analysis determines that the need for the new connection exists.

10. A device for assigning a state to a connection between a mobile terminal and an anchoring gateway situated between a mobile network and a packet switching network, the connection being capable of bearing at least one communication session to the packet switching network, implemented by a piece of equipment that is capable of managing the connection, wherein the device comprises:

means for making a decision about a change of the connection to an obsolete state, as a function of at least one predetermined criterion, and a transmitter configured to transmit a management message comprising at least one piece of information relating to the decided change to the obsolete state without an instruction for the mobile terminal to release the connection, and an identifier relating to the connection.

11. A mobile terminal, capable of setting up at least one connection to at least one anchoring gateway situated between a mobile network and a packet switching network, wherein the mobile terminal comprises:

a device for managing the at least one connection between the mobile terminal and the anchoring gateway, and being capable of bearing at least one communication session to the packet switching network, wherein the device comprises:

a receiver configured to receive a management message from a piece of equipment that is capable of managing said at least one connection, said message comprising a piece of information relating to a change of the connection to an obsolete state without an instruction for the mobile terminal to release the connection, and an identifier relating to the connection, means for determining a need for a new connection, by analysis of said at least one connection in progress at least on the basis of the received information, and a transmitter configured to transmit a request for setup of the new connection between the mobile terminal and a new anchoring gateway, as a function of the analysis and is implemented when the analysis determines that the need for the new connection exists.

12. A piece of equipment, capable of managing at least one connection between at least one mobile terminal and at least one anchoring gateway situated between a mobile network and a packet switching network, wherein the piece of equipment comprises:

a device for assigning a state to the connection between the mobile terminal and the anchoring gateway, the connection being capable of bearing at least one communication session to the packet switching network, wherein the device comprises:

means for making a decision about a change of the connection to an obsolete state, as a function of at least one predetermined criterion, and a transmitter configured to transmit a management message comprising at least one piece of information relating to the decided change to the obsolete state without an instruction for the mobile terminal to release the connection, and an identifier relating to the connection.

* * * * *